(12) United States Patent
Sood et al.

(10) Patent No.: US 8,149,747 B2
(45) Date of Patent: Apr. 3, 2012

(54) POWER SAVING OPERATION OF ALWAYS-CONNECTED WIRELESS ROAMING

(75) Inventors: Kapil Sood, Beaverton, OR (US); Tsai James, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1000 days.

(21) Appl. No.: 11/864,688

(22) Filed: Sep. 28, 2007

(65) Prior Publication Data

US 2009/0086660 A1 Apr. 2, 2009

(51) Int. Cl.
*G08C 17/00* (2006.01)
(52) U.S. Cl. ................. 370/311; 455/432.1
(58) Field of Classification Search .......... None
See application file for complete search history.

(56) References Cited

U.S. PATENT DOCUMENTS

| | | | | |
|---|---|---|---|---|
| 7,310,535 | B1 * | 12/2007 | MacKenzie et al. | 455/522 |
| 7,536,209 | B2 * | 5/2009 | Shoobridge | 455/574 |
| 2002/0124198 | A1 * | 9/2002 | Bormann et al. | 713/323 |
| 2003/0121027 | A1 | 6/2003 | Hines | |
| 2005/0216577 | A1 | 9/2005 | Durham et al. | |
| 2007/0032238 | A1 * | 2/2007 | Kim et al. | 455/436 |
| 2007/0060127 | A1 * | 3/2007 | Forsberg | 455/436 |
| 2007/0140199 | A1 * | 6/2007 | Zhao et al. | 370/338 |
| 2007/0143637 | A1 | 6/2007 | Tsai | |
| 2007/0280179 | A1 * | 12/2007 | Van Belle et al. | 370/338 |
| 2007/0294760 | A1 * | 12/2007 | Sood | 726/15 |
| 2009/0059899 | A1 * | 3/2009 | Bendelac | 370/352 |

OTHER PUBLICATIONS

U.S. Appl. No. 11/688,038, filed Mar. 19, 2007, inventor Hazra et al.
802.11R, IEEE Standard for Information technology—Telecommunications and information exchange between systems—Local and metropolitan area networks—Specific requirements; Par 11: Wireless LAN Medium Access Control (MAC) and Physical Layer (PHY) Specifications; Amendment 2: Fast Basic Service Set (BSS) Transition; Sponsored by the LAN/MAN Standards Committee; Approved May 9, 2008, Published Jul. 15, 2008.
International Search Report for PCT/008/077840, filed Sep. 26, 2008, mailed Apr. 13, 2009.
Agarwal, Yuvraj , et al., "Somniloquy: Maintaining Network Connectivity While Your Computer Sleeps", *Microsoft MSR-TR-2008-42*, (Mar. 2008), Abstract & Sections 1-5.
Gunaratne, Chamara , et al., "Managing Energy Consumption Costs in Desktop PCs and LAN Switches With Proxying, Split TCP Connections, and Scaling of Link Speed", *International Journal of Network Management*, (2005), 297-310.

(Continued)

*Primary Examiner* — Phirin Sam
(74) *Attorney, Agent, or Firm* — Blakely, Sokoloff, Taylor & Zafman LLP

(57) ABSTRACT

Methods and apparatuses enable maintaining wireless connectivity while the wireless client device is in a power save mode. The system includes a host operating system (OS) that handles wireless connections while the device is executing in normal operation, and an embedded agent that handles the wireless connections when the device switches to power saving operation and the host OS switches to a sleep or standby state. The system detects a change in the power save mode and triggers an exchange of session context information between the host OS and the embedded agent (from the host OS to the embedded agent when the system enters the power save mode, and from the embedded agent to the host OS when the system returns to normal operation from the power save mode). The system also triggers the switching of management consistent with the passing of session context information.

18 Claims, 4 Drawing Sheets

OTHER PUBLICATIONS

Sorber, Jacob, et al., "Turducken: Hierarchical Power Management for Mobile Devices", *Proceedings of the 3rd International Conference on Mobile Systems, Appliances, and Services*, Jun. 6-8, 2005, Seattle, WA, Jun. 2005, 261-274.

International Preliminary Report on Patentability for Patent Application No. PCT/US2008/077840, Mailed Apr. 8, 2010, 7 pages.

* cited by examiner

POWER SAVING OPERATION OF ALWAYS-CONNECTED WIRELESS ROAMING

FIELD

Embodiments of the invention relate to wireless communication, and more particularly to always-connected wireless roaming with cooperating communication systems.

BACKGROUND

Wireless mobile devices connect to a wireless network for network access. The connection to the wireless network generally requires processing within the wireless mobile device. The processing may include performing algorithms and executing routines that configure the client device, and exchange messages related to establishing and/or maintaining a session with the network. However, the nature of wireless client devices with limited battery potential requires a designer to consider the battery life of the device. The processing and overhead in simply remaining connected to a wireless network may consume a significant amount of battery life for the client device.

Platform limitations associated with traditional client devices include the need for the entire platform subsystem (processor, memory, hard drives, etc.) to be activated if a mobile platform requires always-on connectivity. The need for the entire subsystem to be activated results from the traditional platform design that loads the entire wireless subsystem (wireless hardware driver, supplicant, and credentials) on the main processor through the host operating system. The loading of the main processor consumes large amounts of power relative to the battery life. Such power consumption is particularly noticeable every time the user roams and the platform expends power to maintain wireless network connectivity.

Thus, traditional systems require a user to trade off between operating a platform in a power saving mode of operation, or maintaining network connectivity. There is no traditional ability to maintain wireless connectivity and operate in a power save mode.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
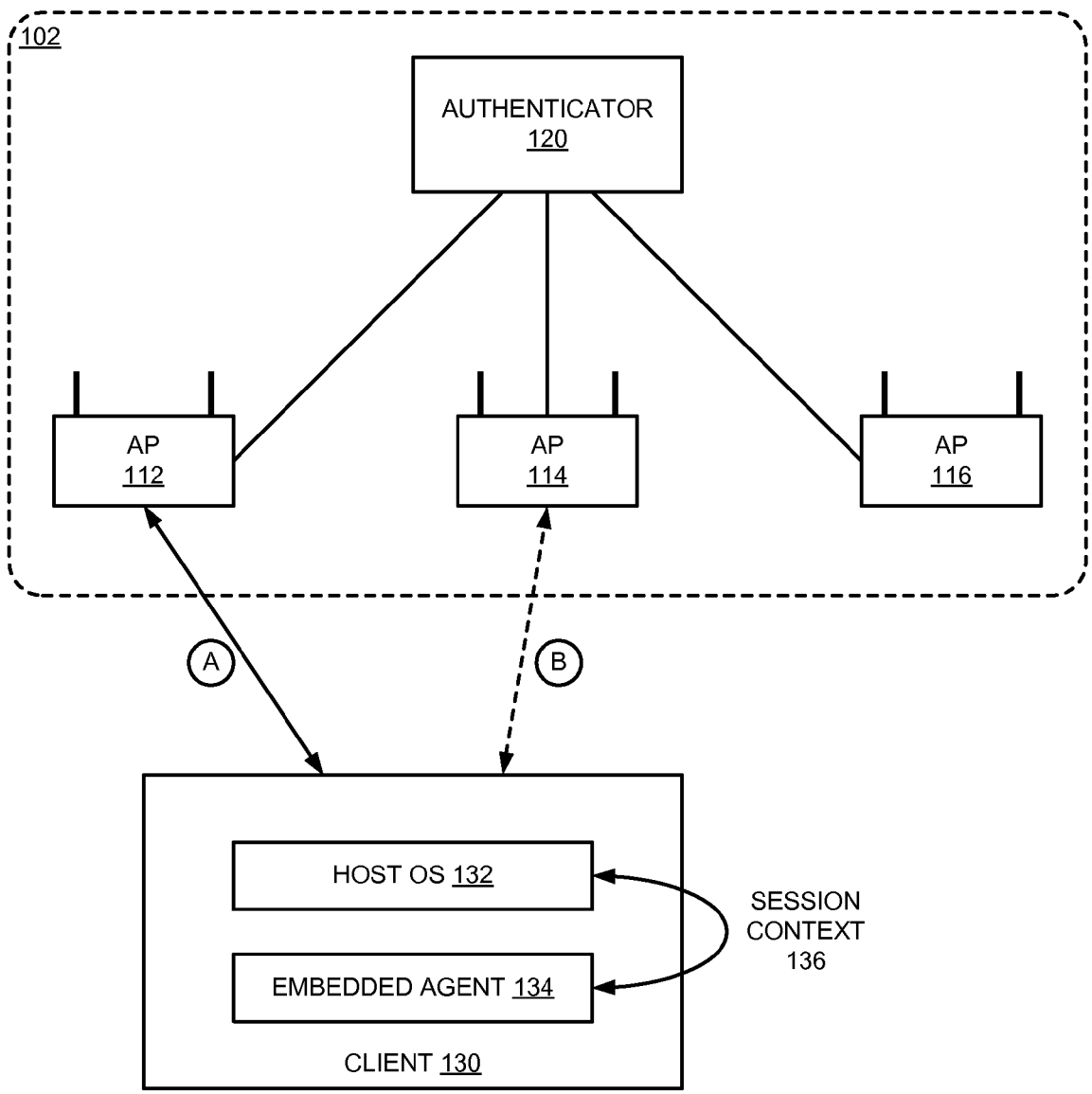
FIG. 1 is a block diagram of an embodiment of a system with a client device having a host operating system and embedded agent that exchange wireless session context information.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As provided herein, systems, methods, and apparatuses enable operation of a power save mode while maintaining network connectivity, including managing roaming. An embedded agent works in connection with a main host processor to provide connectivity when the host processor is operating in a power save mode. As used herein, a main processor or a host processor refers to a processor or processing unit (including cores of a multi-core processor) on which the main operation of a system is executed. A host operating system (OS) will be executed by the main processor, which controls the flow of operation in the system. An embedded agent can refer to any of a number of technologies. Generally, an embedded agent refers to an entity on the client device that operates independently of the host OS. That is, the host operating system does not control the operation of the embedded agent. While the host OS may be able to communicate with the embedded agent via interfaces of, for example, a driver, the host OS may be otherwise unable to "see" or interact with the embedded agent. The embedded agent could be, for example, a dedicated one of multiple cores in a multi-core processor, a separate microcontroller (such as ACTIVE MANAGEMENT TECHNOLOGY (AMT) of INTEL CORPORATION of Santa Clara, Calif.) embedded on the host hardware platform, a microcontroller on a network interface circuit, code executing in a microcontroller of network interface hardware, a virtual partition of a virtual machine, etc.

The host OS executes the main wireless connection management, as is previously known. The wireless connection components (e.g., supplicant, key modules, etc.) are loaded on the main system processor via the host OS. Additionally, the embedded agent includes one or more of the connection components to enable the embedded agent to maintain always-connected mobility and maintain connections with a wireless broadband data network. Maintaining connections includes maintaining quality of service (QoS) and/or security parameters. As used herein, the wireless network will be assumed to be a wireless broadband data network. Such networks include those described in standards such as the Wi-Fi and WiMax standards. Wi-Fi standards refer generally to the family of IEEE (Institute of Electrical and Electronics Engineers) 802.11 standards for wireless local area networks (WLANs) including IEEE 802.11a-1999 published in February 1999, IEEE 802.11b-1999 published in February 1999, IEEE 802.11g-1999 published in October 2003, and/or derivatives thereof. WiMax standards refer generally to IEEE 802.11 standards for wireless metropolitan area networks (WMANs) including IEEE 802.16-2004 in October 2004, or derivatives thereof. Note a distinction between wireless broadband data networks and cellular or wireless voice channel networks. The bandwidths for data traffic in the wireless broadband data networks are considerably higher than that of cellular networks. The mechanisms for connection, while they may have some similarities in the two types of networks, generally require more from client devices in the wireless broadband data networks. Thus, power saving in cellular networks is relatively well developed, while there is a general lack of options for client devices of wireless broadband networks (e.g., laptops, handheld computers, personal digital assistants (PDAs), ultra mobile personal computers (UMPCs), etc.).

Thus, as provided herein, the main processor via the host OS executing on the main processor, manages connectivity procedures (e.g., executing algorithms, operating protocols, etc.) when the client device is in normal operation. The algorithms, protocols, drivers, modules, etc., for management of the connectivity can be referred generically as "components." The main processor may generally have a full set or a majority of the components as would be common in traditional systems. However, in addition to the components in the host OS, the embedded agent manages connectivity procedures in power saving operation. In one embodiment, the embedded agent includes a reduced set of components.

In one embodiment, the embedded agent is responsible for executing roaming procedures as set forth in IEEE 802.11r WLAN Fast Roaming (an emerging standard in draft phase as of the filing of this application). Similar techniques could be employed in other wireless broadband data networks, such as IEEE 802.16 or IEEE 802.21 heterogeneous roaming across different wireless networks.

Due to the dependency on the driver and protocols running the on the host OS, traditional WiFi/WiMAX devices need the complete platform to be alive, which generally requires something on the order of 18 Watts of power, even when there is no active workload. However, with the power saving roaming handled by the embedded agent, the host OS and main processor can be in standby (or equivalent) mode, which consumes as little as 500 mW of power. The power required by the embedded agent is generally many orders less than the power required by the complete host platform. Thus, substantial (greater than 90%) power savings are possible over traditional systems.

In one embodiment, multiple active connection contexts are maintained. Passing session context information from the host OS to the embedded agent, or vice versa, can include sending session context information about all active connections. In such an implementation, separate session context information may be maintained for each different domain. Roaming between administratively separate domains will still be possible, although distinct contexts and keying material may be required for each separate domain. As an example, consider a user that roams with a client device a T-MOBILE hotspot and an AT&T hotspot. Note that T-Mobile and AT&T are trademarks that are the property of their respective owners, T-Mobile USA, Inc. of Bellevue, Wash. and AT&T Inc. of San Antonio, Tex. All trademarks herein are used solely for purposes of identification.

Another domain scenario is the scenario where applications on a client device use distinct networking connections (e.g., a Voice application (a voice over internet protocol (VOIP) phone), or a Video application such as a streaming video application). Another domain scenario may be where a client device roams between 802.11 WLAN and 802.16 WMAN networks. In all such domain scenarios, the system can maintain separate session contexts, which will be maintained by the embedded agent in the power save operation.

Note that addition of the embedded agent and the operation of the embedded agent to perform wireless roaming do not require changes to the host platform configuration or software stack. In one embodiment, all changes to the host platform can be implemented at the low level device drivers. Thus, updating the drivers for particular devices can enable the operation of the embedded agent-assisted roaming described herein.

FIG. 1 is a block diagram of an embodiment of a system with a client device having a host operating system and embedded agent that exchange wireless session context information. System 100 includes wireless broadband data network 102, which includes APs (access points) 112-116 and authenticator 120. APs 112-116 represent wireless connection points or network access devices that enable client device 130 to wirelessly obtain network access. APs 112-116 provide the physical link for the network connection. Authenticator 120 provides higher-level session management for client 130. Such higher-level session management includes verifying the security credentials (e.g., access keys) of client 130 and establishing a wireless session.

In one embodiment, client 130 performs a secure 802.11r Initial Association with AP 112, via access link A. Client 130 then has access for a voice, video, or other application via AP 112. Client 130 is then switched to operate in a power save mode. As discussed herein, the power save mode may be said to be initiated, entered, or triggered. The power save mode is an operating mode where the host OS is suspended, and the host processor is in a standby mode. Typically power is sustained to volatile random access memory (RAM) to prevent loss of state. Alternatively, flash memory could be used to maintain state. Because the power save mode affects the platform and the host OS, the power save mode may be considered from one perspective to be triggered by the host OS. When referring to the power save mode being triggered or initiated by the host OS, it may be the OS itself that initiates the power save mode, or some software executing on the execution platform of the host OS.

In conjunction with the switch to power save mode (e.g., as part of a suspend process) or otherwise responsive to the power save mode, host OS 132 provides session context 136 to embedded agent 134. Session context 136 in this example will include information related to link A with AP 112, including keying information. After client 130 has entered the power save mode, consider that the client device roams outside the range of AP 112, but into the range of AP 114 (the figure is intended to represent the logical operation, not the physical and distance aspects of the example). Embedded agent 130 is provided the session context information and is enabled to manage the wireless connections. The appropriate communication processing components are activated in embedded agent 134. Because embedded agent 134 consumes significantly less power than the main sub-system operated by host OS 132, the embedded agent can be kept alive (powered-up) most of the time. Embedded agent 134 maintains state (connectivity, security, QoS, etc.) of the wireless connection as the main processor goes into deep sleep, and executes the wireless roaming algorithms and protocols as client 130 roams away from AP 112 (the current AP) to subsequent APs (such as AP 114).

Embedded agent 134 detects AP 114, and executes roaming procedures to connect to that AP. Such roaming procedures may be, for example, 802.11r FT (Fast Transition) Base and Reserve mechanisms. Thus, client 130 maintains connected although the main processor and host OS are suspended. The client may continue to roam via embedded agent 134 until the host OS comes out of power save. The reasons for coming out of power save may be associated with particular interrupts or wake mechanisms as are understood in the art.

Embedded agent 134 detects the change in power save operating status, namely the change from power save to normal operation. Responsive to detecting the change in state, embedded agent 134 provides session context 136 to host OS 132. Note that session context 136 will be different in this example when client 130 comes out of the power save mode. The change is at least because client 130 is now connected to AP 114 instead of AP 112. Other changes may also have been made. When host OS 132 comes out of sleep, the client is already connected, which saves connection latency while saving power. The application can continue uninterrupted operation.

Figure 2:
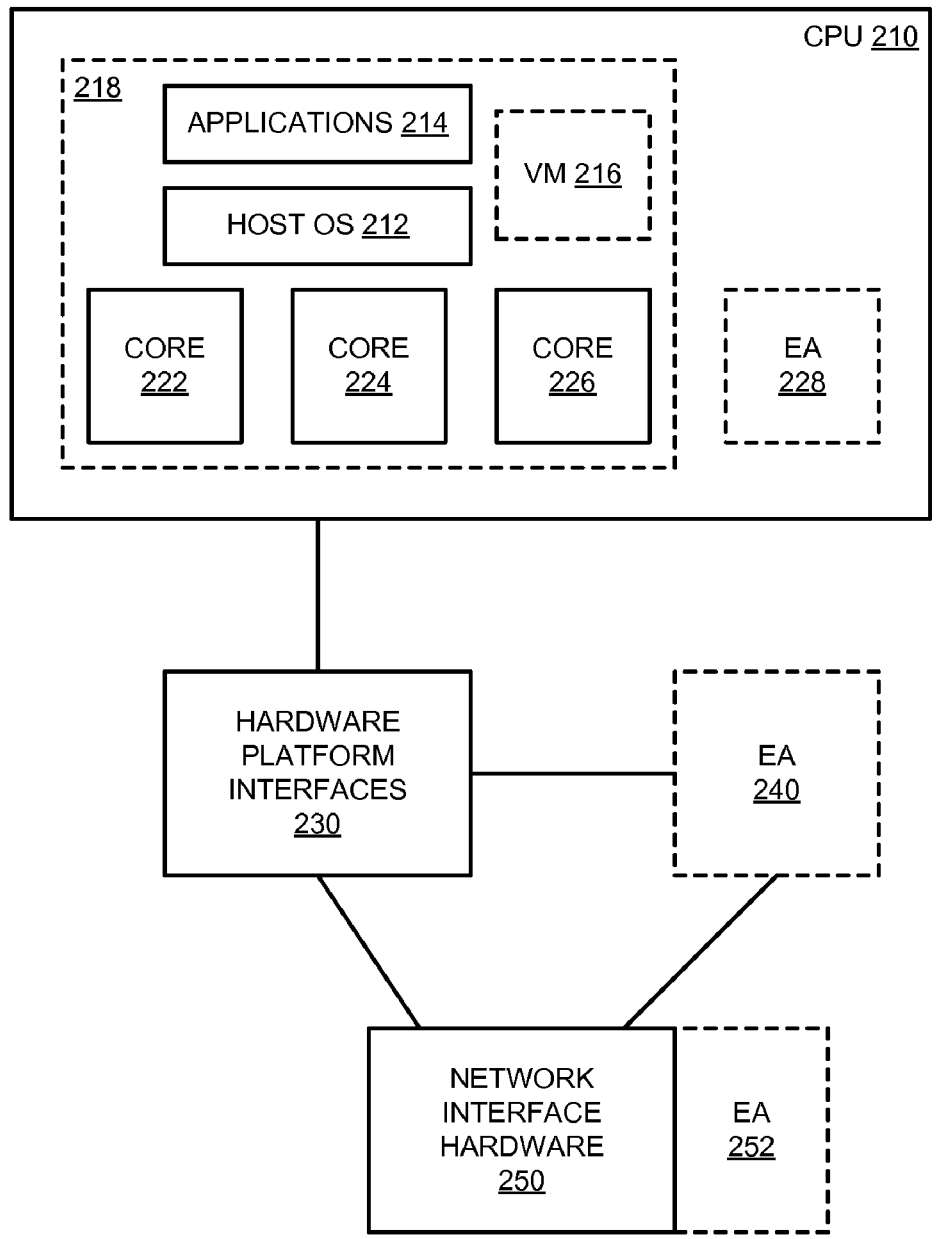
FIG. 2 is a block diagram of an embodiment of a client device having an embedded agent that manages wireless session connectivity.

FIG. 2 is a block diagram of an embodiment of a client device having an embedded agent that manages wireless session connectivity. System 200 represents certain components of a client device. System 200 includes CPU (central processing unit) 210, which may be one or more processors. As depicted, CPU 210 is a multi-core device. Specifically, CPU 210 includes four processing cores, which includes cores 222-226, and EA (embedded agent) 228. The main host subsystem 218 includes cores 222-226, host OS 212, and one or more applications 214. In such an implementation, one processing core is dedicated to other operations, and is not available to main host subsystem 218. Thus, host OS 212 is not necessarily aware of embedded agent 228, and would need to interface with embedded agent 228 as though the embedded agent were part of a separate system. With one of the cores dedicated as embedded agent 228, the embedded agent can perform operations such as the wireless roaming discussed herein. Embedded agent 228 may include separate cache and/or memory resources for execution. Note that main host subsystem 218 can include all four cores in an implementation where the embedded agent is provided in some way other than as a dedicated core.

In one embodiment, subsystem 218 could include the fourth core, as the embedded agent could be provided as VM (virtual machine) partition 216. VM 216 represents a virtual partition, which creates parallel independent operating environment concurrently sharing hardware resources on system 200. The operation of the embedded agent as VM 216 can allow a reduced operating environment to execute while host OS 212 is in a power save mode.

System 200 includes hardware platform interfaces 230. Hardware platform interfaces 230 may be part or all of a so-called "north bridge" in certain computing device architectures. Hardware platform interfaces 230 may include memory interfaces, input/output (I/O) interfaces, peripheral interfaces, storage interfaces, etc. Hardware platform interfaces 230 includes one or more interfaces to network interface hardware 250 (e.g., via a PCI (Peripheral Component Interconnect) bus).

In one embodiment, system 200 includes a standalone hardware component that functions as an embedded agent as described herein. EA 240 represents such a hardware component. EA 240 is illustrated coupled to hardware platform interfaces 230. EA 240 can monitor the activity of CPU 210, and determine, for example, when subsystem 218 is triggered to enter a power save mode. EA 240 includes a connection to network interface hardware 250, which enables EA 240 to manage the network interface hardware and drive the wireless connectivity of system 200.

In one embodiment, the embedded agent can be executed as code on network interface hardware 250. Thus, EA 252 represents code and/or a processor on the network interface hardware that can provide the embedded agent functionality described herein. Note that system 200 would typically only include a single embedded agent, although multiple embedded agents could be configured to execute within system 200. Thus, a more common embodiment would include one of the dashed embedded agents illustrated, and the others would not be present.

Network interface hardware 250 is used by host OS 112 and whichever embedded agent is present in system 200 for wireless communication with a network, including roaming. In one embodiment, the embedded agent will have a "main" connection to the network interface that controls the wireless communication, and a dedicated or out-of-band communication channel. That is, host OS 112 and the embedded agent will be able to be configured on network interface hardware 250 to manage the wireless connections. Generally only one or the other will be configured on the hardware—the configured one being the one currently in control of managing the session context information. However, the mere fact that the embedded agent is not configured to manage the wireless connections does not necessarily mean the embedded agent is unable to access or control one or more communication channels or functions with network interface hardware 250.

Figure 3:
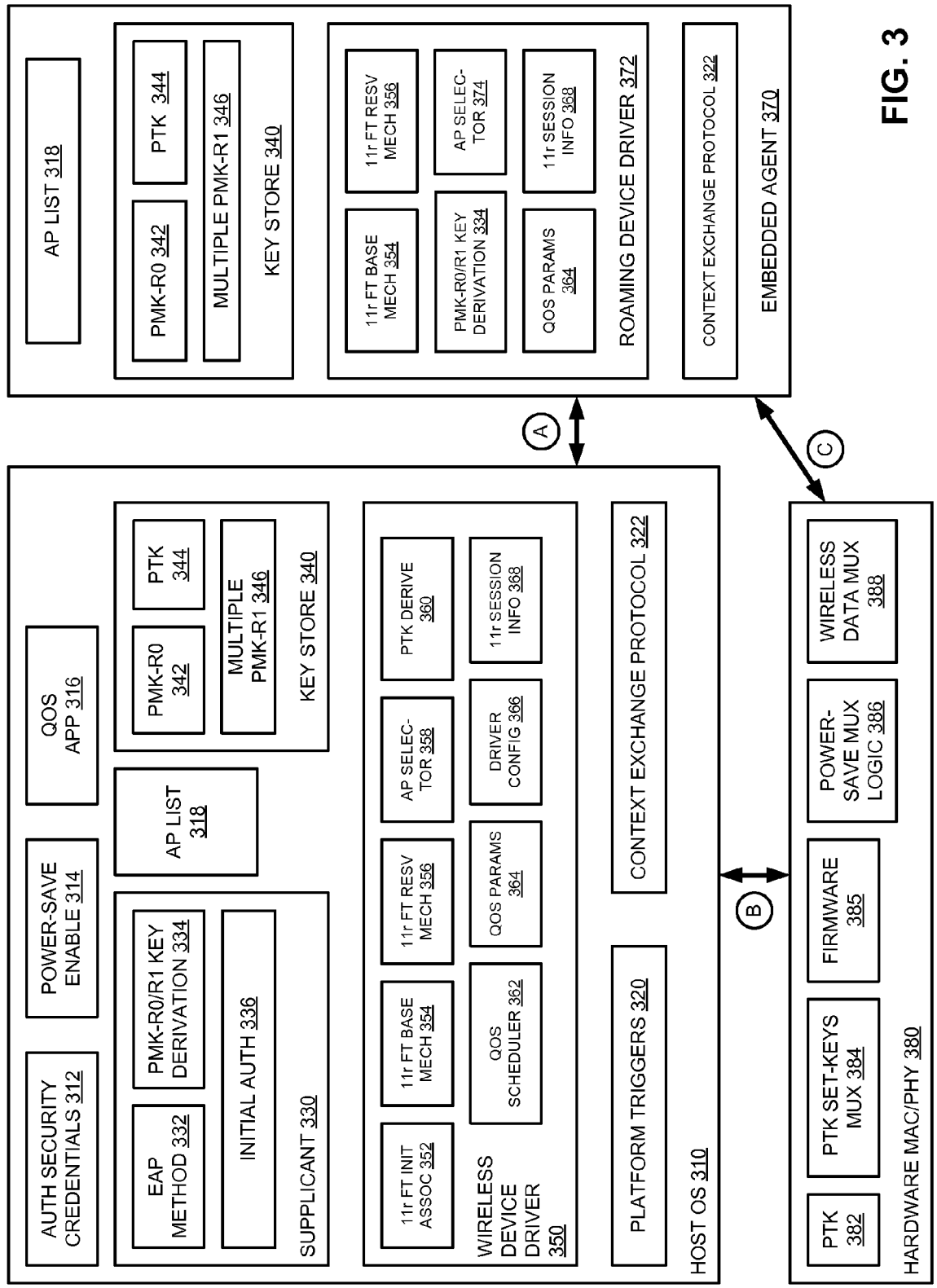
FIG. 3 is a block diagram of an embodiment of a client device having elements of a host operating system and embedded agent that exchange wireless session context information.

FIG. 3 is a block diagram of an embodiment of a client device having elements of a host operating system and embedded agent that exchange wireless session context information. The client device of FIG. 3 includes host OS 310, embedded agent 370, and hardware MAC/PHY 380. Host OS 310 represents a host OS as discussed in any embodiment described herein. Embedded agent 370 represents an implementation of any type of embedded agent described herein. Hardware MAC/PHY 380 represents MAC (media access control) and/or PHY (physical) layer hardware that provides the hardware interfaces necessary to connect to a wireless network.

Host OS 310 includes a number of components that may execute on the main processor under the host OS for wireless connectivity. Other components for other purposes may also be executing. Host OS 310 includes authentication (auth) security credentials 312, which are presented to authenticate a user or a client device for network access. The security credentials may include, for example, a user name and password. Host OS 310 includes power-save enable 314, which provides a user or a system administrator configuration options in using a power save mode. For example, a user can select whether to configure the system to pass context information to the embedded agent and have the embedded agent maintain the client device always connected. Such a feature could be turned off. In one embodiment, power-save enable 314 is a configuration parameter directed to a device driver to indicate that certain procedures/routines are to be used. Thus, the same device drivers could be used on all platforms, and power-save enable may be only triggered on platforms having an appropriate embedded agent present that can manage the wireless connectivity in power save mode.

QoS (quality of service) application (app) 316 represents an application that not only has network access, but may specify operating parameters that define a level of service expected for the application. The application may be one that provides a service related to video, voice, messaging, or email, for example. AP (access point) list 318 provides a list of access points on which the client device may be configured. Thus, AP list 318 may represent a list of "known" network connection points.

Supplicant 330 represents any type of client security software used for performing complete client authentication with the network. In general, supplicant 330 implements all authentication methods, as configured on the main OS and by the network administrator. In one embodiment, initial connection to a network may involve a complete client authentication, which requires sending and receiving keys and security information up the network to security decision points and policy enforcement points (such as authenticator 120 of FIG. 1). Subsequent authentication (roaming authentication) can be performed with a faster, more efficient algorithm. Supplicant 330 may include an EAP (Extensible Authentication Protocol) method 332, which determines/defines the protocol method for exchanging security information. PMK-R0/R1 (pairwise master key-roaming level 0/roaming level 1) key derivation 334 enables supplicant 330 to derive keys for the authentication procedure and/or encryption for communication related to establishing the session (and thus, use the master key). Initial authentication (auth) 336 provides an initial 802.11r Association EAP authentication, which indicates information about the session.

Host OS 310 includes key stored 340, which stores security keys used for performing fast roaming and secure mobility. All software components access appropriate keys from key store 340 during operation. Examples of keys included are PMK-R0 key 342, PTK (pairwise transition key) 344, and multiple PMK-R1 keys 346. PMK-R0 key 342 represents the key managing the session with the authentication authority of the network to which the client device is connected. PMK-R1 keys 346 represent keys associated with the connection of the client device to each AP. PTK 344 represents a key associated with roaming from one AP to another.

Host OS 310 includes and/or manages wireless device driver 350. Device driver 350 as illustrated includes a number of components associated with an implementation compatible with IEEE 802.11r fast roaming protocol mechanisms. 11r FT (fast transition) initial (init) association (assoc) 352 represents a module for establishing an association with an AP for the first time during a session (it may or may not be the first time ever that the client is connected to the AP. 11r FT base mechanism (mech) 354 represents a fast transition mechanism that builds upon the connection already established at the network for the client device. Thus, the authentication is dependent on the base authentication that already exists for the device. 11r FT reservation (resv) mechanism 356 provides fast roaming reservation.

Device driver 350 includes AP selector 358, which represents one or more modules that access AP list 318 to determine whether a detected wireless signal is associated with a known AP. If the signal is associated with a known AP, the device driver may trigger a configuration routine that determines which of the known APs provides the best connection option. In one embodiment, AP selector 358 may have the ability to automatically connect to a best possible connection out of multiple APs that are detected.

PTK derive 360 provides a functional module to enable device driver 350 to derive and use roaming keys. QoS scheduler 362 provides the ability to schedule traffic allocation according to the requirements for different traffic. Such scheduling may include taking into account the power save mode or normal operating mode of the client device. QoS parameters (params) 364 provide the configuration and options for scheduling according to the QoS requirements of particular applications. Driver configuration (config) 366 stores main driver configuration options and current settings. 11r session information (info) 368 includes security credentials, keys, and security configurations necessary to maintain the session. For example, the session information also includes the PMK-R0 key, from which the PMK-R1 key can be derived. Such session information is transferred to embedded agent 370 when host OS 310 enters a power save mode, and is returned from embedded agent 370 when host OS 310 resumes normal operation.

Host OS 310 also includes one or more platform triggers 320, which indicates mechanisms that might trigger the host OS to awake from sleep. Such triggers could be exceptions or errors, a request by the network to perform a full authentication again, a timing mechanism, a user input to awake the device from a low-power state, an external command, or other mechanisms. Context exchange protocol 322 represents a protocol used by host OS 310 to exchange session context information with embedded agent 370. Link A represents the session context transfer.

Embedded agent 370 includes many of the same functional components as host OS 310. Note that it is possible that the implementation of these components is not exactly the same as the implementation of the same components in host OS 310. Thus, components with common functionality in embedded agent 370 are labeled with the same numbering as comparable components in host OS 310. However, such labeling does not necessarily imply that the components are precisely the same as implemented in host OS 310 and embedded agent 370. There is also not necessarily a requirement that they be implemented differently, except as will be understood for power saving and/or configuration reasons. Not every implementation of an embedded agent will necessarily include each of the components described.

Thus, embedded agent 370 includes AP list 318 to identify/detect APs to which the client device can connect. Embedded agent 370 includes key store 340 with PMK-R0 key 342, PTK 344, and multiple PMK-R1 keys 346. Embedded agent 370 includes roaming device driver 372, which will generally be implemented with similar components as device driver 350, but have fewer components. Thus, the general implementation of roaming device driver 372 is as a smaller, more optimized device driver as compared to device driver 350 of host OS 310.

Roaming device driver 372 includes components necessary to implement roaming and maintain wireless connections when embedded agent 370 is responsible for maintaining wireless connectivity. As illustrated, roaming device driver 372 11r FT base mechanism 354, 11r FT reservation mechanism 356, PMK-R0/R1 key derivation 334 (for deriving the R1 and/or the R0 key), AP selector 374, and QoS parameters 364. With such components, roaming device driver 372 implements roaming algorithms and IEEE 802.11r fast roaming protocol mechanisms. In one embodiment, embedded agent 370 only implements fast transition authentication, not new authentication. When new authentication is not performed, the device driver does not need to implement complex multiple mutual authentication methods.

As described herein, host OS 310 and embedded agent 370 exchange session context information when switching responsibility for roaming. Such an exchange can be understood as host device driver 350 synchronizing with roaming device driver 372 on specific information essential for enabling the other driver to perform independent fast roaming. Roaming device driver 372 includes 11r session information 368, which is comparable to the similar block in device driver 350. However, note that such information is not necessarily static, but rather will change with time as the device roams.

Session information 368 includes information such as driver state variables, configuration, options, and roaming parameters. Such information may include QoS parameters such as current/desired TSPECs (traffic specifications), TCLAS (traffic class) elements, currently used key hierarchy root keys, mobility domains within which the client can roam, and key holder identifiers where the client first established root keys. The list of information above is not intended to be limiting, but provides examples of the types of information that could be stored.

In one embodiment, embedded agent 370 does not need to implement sophisticated AP selection algorithms, but does need to keep a cache of potential candidate APs for roaming. Thus, AP selector 374 will generally be less sophisticated than AP selector 358. Roaming device driver 372 components maintain a list of keys derived from the key hierarchy, and is capable of implementing IEEE 802.11r protocol including Fast BSS (base station subsystem) transition protocol. Embedded agent 372 also includes context exchange protocol 322 to enable the exchange of session context with host OS 310.

The client device also includes hardware MAC/PHY 380, which is accessible to both host OS 310 and embedded agent 370. Hardware MAC/PHY 380 includes communication link B with host OS 310 (e.g., a PCI bus connection) and communication link C with embedded agent 370 (e.g., an adjunct device channel). Both the main processor and the embedded agent driver share the same wireless driver MAC address, and can configure security parameters in the WLAN (wireless local area network) hardware. Each can appropriately configure and execute WLAN firmware code in the WLAN hardware.

Hardware MAC/PHY 380 may include a number of components. PTK 382 represents a transition key, which may be the same or related to PTK 344. PTK set-keys multiplexer (mux) 384 enables the device to use the keys for hardware processing. Firmware 385 provides operating logic for the hardware. Power-save multiplexer logic 386 can provide different logic for use in power saving operation. Wireless data mux 388 allows multiplexing of data on the different connections that may be open.

Various components described herein may be a means for performing the functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

Figure 4:
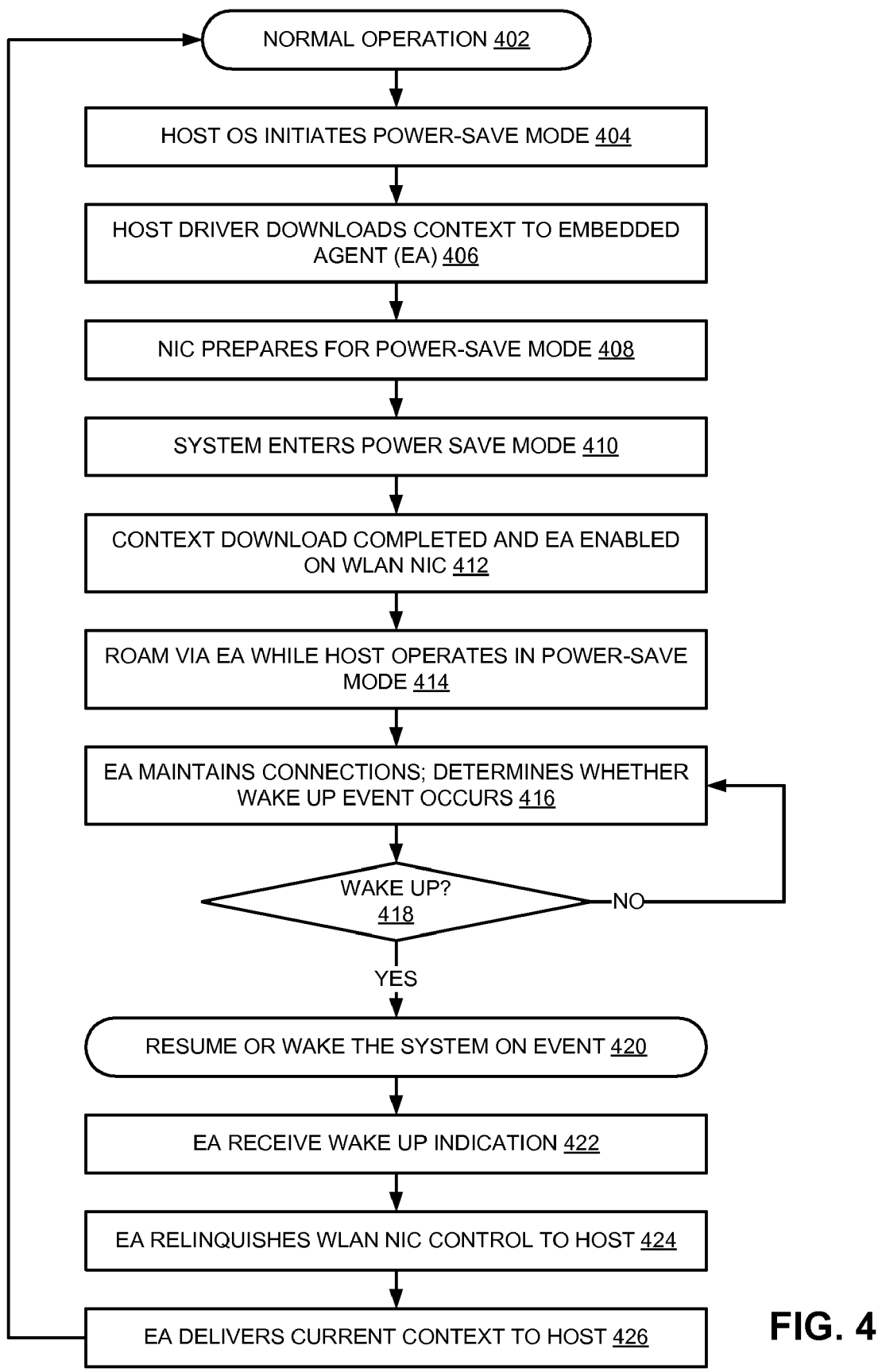
FIG. 4 is a flow diagram of an embodiment of a process for maintaining wireless connectivity in a power save mode of a wireless client device.

FIG. 4 is a flow diagram of an embodiment of a process for maintaining wireless connectivity in a power save mode of a wireless client device. Flow diagrams as illustrated herein provide examples of sequences of various process actions. Although shown in a particular sequence or order, unless otherwise specified, the order of the actions can be modified. Thus, the illustrated implementations should be understood only as an example, and the process for establishing the secure channel can be performed in a different order, and some actions may be performed in parallel. Additionally, one or more actions can be omitted in various embodiments of the invention; thus, not all actions are required in every implementation. Other process flows are possible.

The client device executes in normal operation 402, where the host OS manages the wireless connections of the client. The host OS or a component on the platform of the host OS initiates a power-save mode, 404. Initiating the power save mode causes the host OS driver to download context information to the embedded agent, 406. In conjunction with the passing of context information, the management of the wireless connections is also configured on the hardware. Thus, the network interface hardware, such as a network interface card (NIC), prepares for power save mode, 408. The NIC may change certain components that will be used in power save mode. The NIC may also store certain values or information for use in power save operation. The NIC also configures the change of control from the host OS to the embedded agent.

The system enters the power save mode, 410. The context download is completed to the embedded agent, and the embedded agent is enabled on the WLAN NIC, 412. The embedded agent then controls roaming while the host operates in the power save mode, 414. The embedded agent maintains wireless connections, and monitors for a wake up event, 416. Thus, the embedded agent may regularly or continually determine whether a wake up even occurs.

In one embodiment, the embedded agent raises exceptions to the main host processor under one or more of the following conditions. A first condition is if the client roams out of the possible roaming domain. A second condition is if the embedded agent does not have the current context, keys, or other elements required for processing the roaming protocol. A third condition is if the embedded agent fails to authenticate the target wireless AP. A fourth condition is if the wireless AP requires the platform to perform a complete and full authentication, including master key re-keying. A fifth condition is if a network packet is received by the embedded agent that is configured to wake up the host OS (e.g., an incoming chat, incoming mail/IM (instant message), incoming voice mail, etc.). Not all of these conditions need to result in an exception under every implementation. Also, other conditions could be present that would result in an exception in certain implementations. If the embedded agent does not identify one of the above exceptions, or some other wake up event (e.g., a user command to awake the client device), 418, the embedded agent continues to manage the wireless roaming. If a wake up condition or event is detected, 418, the system is to wake up and resume on the event, 420.

When the system is to wake up and resume, the main processor may indicate to the embedded agent that it is ready to take control of the wireless connection. The embedded agent receives the wake up indication and the ready signal from the main wireless device driver, 422. The embedded agent device driver relinquishes control of the WLAN hardware to the host, 424, and delivers the entire session context(s), including changes, to the main driver. The embedded agent may also pass any received packets to the host. That is, any packets that may have been received in conjunction with roaming or with a wake-up event can be stored in the embedded agent and passed to the host upon transfer of context. The system then returns to normal operation, 402.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method in a wireless network client device comprising:
   detecting a change in a power saving operating mode within the wireless network client device,
      where a host operating system on a host hardware platform of the wireless network client device manages network access of the wireless network client in normal operation, and
      where an embedded agent that has independent operation from the host OS manages network access of the wireless network client in power saving operation;
      wherein managing network access includes maintaining an active network access session with a wireless network including managing connectivity and security configuration information of the wireless network client necessary to keep the network access session active;
   exchanging session context between the host OS and the embedded agent of the wireless network client device responsive to detecting the change in the power saving operating mode, the session context defining a network access session of the wireless network client device with a wireless network, the session context including the security configuration information; and
   switching management of roaming for network access for the wireless network client device between the host OS and the embedded agent in conjunction with exchanging the session context responsive to detecting the change in the power saving operating mode.

2. The method of claim 1, wherein detecting the change in power saving operating mode comprises determining that the host OS is resuming normal operation after being in a deep power save mode; and
   wherein exchanging the session context between the host OS and the embedded agent comprises uploading the session context from the embedded agent to the host OS.

3. The method of claim 2, wherein determining that the host OS is resuming normal operation after being in the deep power save mode comprises:
   determining the host OS is awakening from standby.

4. The method of claim 1, wherein exchanging the session context between the host OS and the embedded agent comprises:
   exchanging information related to open network connections, including keying information.

5. The method of claim 1, wherein exchanging the session context between the host OS and the embedded agent comprises:
   exchanging the session context between the host OS and one of a virtual machine independent of the host OS or an embedded firmware agent executing on network interface hardware.

6. The method of claim 1, wherein exchanging the session context between the host OS and the embedded agent comprises:
   exchanging the session context between the host OS and one of an embedded microcontroller on a host hardware platform or a dedicated processing core of a multi-core processing unit.

7. The method of claim 1, wherein switching management of roaming for the wireless network client device comprises:
   switching management of roaming that is compatible with the Institute of Electrical and Electronics Engineers (IEEE) 802.11r standard.

8. An article of manufacture comprising a machine-readable storage medium having content stored thereon to provide instructions which when executed cause a machine to perform operations including:
   detecting initiation of a power saving operating mode in a host operating system (OS) on a host hardware platform of a wireless network client device that connects to a wireless broadband data network,
      where the host OS manages network access of the wireless network client in normal operation, and
      where an embedded agent that has independent operation from the host OS manages network access of the wireless network client in power saving operation;
      wherein managing network access includes maintaining an active network access session with a wireless network including managing connectivity and security configuration information of the wireless network client necessary to keep the network access session active;
   transferring session context related to a network access session of the wireless network client device from the host OS to the embedded agent on the wireless network client device in response to detecting the initiation of the power saving operating mode, the session context defining the network access session of the wireless network client device with the wireless broadband data network, the session context including the security configuration information; and
   performing roaming on behalf of the wireless network client device with the embedded agent while the host OS is in the power saving operating mode.

9. The article of manufacture of claim 8, wherein the content to provide instructions for transferring session context from the host OS to the embedded agent comprises content to provide instructions for
   transferring session context via a wireless device driver to the embedded agent.

10. The article of manufacture of claim 8, wherein the content to provide instructions for transferring session context from the host OS to the embedded agent comprises content to provide instructions for
    transferring session context from the host OS to one of a virtual machine independent of the host OS, an embedded firmware agent executing on network interface hardware, an embedded microcontroller on a host hardware platform, or a dedicated processing core of a multi-core processing unit.

11. The article of manufacture of claim 8, wherein the content to provide instructions for performing the roaming comprises content to provide instructions for
    executing wireless connection management algorithms locally on the embedded agent.

12. The article of manufacture of claim 8, the content to further provide instructions to result in the machine performing operations including:
    monitoring the wireless network client device for an event that will trigger the host OS to switch operation from the power saving operating mode to a normal operating mode.

13. The article of manufacture of claim 12, the content to further provide instructions to result in the machine performing operations including:
    passing updated session context from the embedded agent to the host OS responsive to detecting an event that will trigger the host OS to switch to the normal operation mode.

14. A wireless client device comprising:

a host hardware platform to execute a host operating system (OS), the host OS to manage wireless connections in a normal operating mode, including maintaining the wireless connections with a wireless access point;

an embedded agent to operate independently of the host OS, the embedded agent to manage the wireless connections in a power saving mode when the host OS is not managing the wireless connections, including maintaining the wireless connections with the wireless access point and roaming to a different wireless access point;

wherein managing the wireless connections network access includes maintaining an active network access session with a wireless network including managing connectivity and security configuration information of the wireless network client necessary to keep the network access session active;

transfer logic to switch management of the wireless connections between the host OS and the embedded agent depending on the operating mode, and trigger an exchange of session context that defines a network access session of the wireless client device, the session context including the security configuration information; and network interface hardware to maintain a physical link to a current access point.

15. The wireless client device of claim 14, wherein the embedded agent comprises an agent executed on one of a processor core, a microprocessor on a hardware platform of the wireless client device, or a network interface card.

16. The wireless client device of claim 14, wherein the embedded agent managing the wireless connections comprises maintaining security parameters of the wireless connections.

17. The wireless client device of claim 14, wherein the embedded agent managing the wireless connections comprises maintaining quality of service (QoS) parameters of the wireless connections.

18. The wireless client device of claim 14, wherein the transfer logic triggers an exchange of multiple session contexts for multiple sessions for the wireless client device.

* * * * *